United States Patent
Kunieda et al.

(10) Patent No.: US 8,992,847 B1
(45) Date of Patent: *Mar. 31, 2015

(54) HONEYCOMB STRUCTURE

(71) Applicant: Ibiden Co., Ltd., Ogaki-Shi (JP)

(72) Inventors: Masafumi Kunieda, Ibi-Gun (JP); Yosuke Matsukawa, Ibi-Gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/560,159

(22) Filed: Dec. 4, 2014

Related U.S. Application Data

(63) Continuation of application No. 13/327,756, filed on Dec. 16, 2011, now Pat. No. 8,932,532.

(30) Foreign Application Priority Data

Mar. 29, 2011 (WO) .................. PCT/JP2011/057858

(51) Int. Cl.
*B01J 29/88* (2006.01)
*B01J 29/70* (2006.01)
*B01J 35/04* (2006.01)
*C04B 111/00* (2006.01)

(52) U.S. Cl.
CPC .............. *B01J 29/88* (2013.01); *B01J 29/7007* (2013.01); *B01J 35/04* (2013.01); *C04B 2111/00818* (2013.01)
USPC .......................................... 422/180; 422/177

(58) Field of Classification Search
CPC ............. C04B 2111/00818; C04B 2103/0087; C04B 38/0006; C04B 14/4625
USPC ................................. 422/177, 180
See application file for complete search history.

(56) References Cited

U.S. PATENT DOCUMENTS

| | | |
|---|---|---|
| 4,637,995 A | 1/1987 | DeAngelis et al. |
| 5,610,117 A | 3/1997 | Horiuchi et al. |
| 6,641,788 B1 | 11/2003 | Ogawa et al. |

(Continued)

FOREIGN PATENT DOCUMENTS

| | | |
|---|---|---|
| EP | 1847320 | 10/2007 |
| EP | 2130604 | 12/2009 |
| EP | 2371450 | 10/2011 |
| JP | 11-216358 | 8/1999 |
| JP | 2003-103165 | 4/2003 |

(Continued)

OTHER PUBLICATIONS

Extended European Search Report for corresponding EP Application No. 11190916.4-1213, Feb. 9, 2012.

*Primary Examiner* — Tom P Duong
(74) *Attorney, Agent, or Firm* — Mori & Ward, LLP

(57) ABSTRACT

A honeycomb structure includes a honeycomb unit. The honeycomb unit has a plurality of through holes defined by partition walls along a longitudinal direction of the honeycomb unit. The partition walls have a thickness of approximately 0.1 mm to approximately 0.4 mm. The honeycomb unit is manufactured by molding raw material paste by extrusion molding and thereafter by firing the molded raw material paste. The raw material paste contains zeolite and an inorganic binder. A specific surface area of the zeolite is more than or equal to approximately 500 $m^2/g$ and less than or equal to approximately 800 $m^2/g$. An external surface area of the zeolite is more than or equal to approximately 40 $m^2/g$ and less than or equal to approximately 80 $m^2/g$.

11 Claims, 2 Drawing Sheets

(56) References Cited

U.S. PATENT DOCUMENTS

| | | |
|---|---|---|
| 2008/0141661 A1 | 6/2008 | Voss et al. |
| 2009/0291824 A1 | 11/2009 | Ohno et al. |
| 2009/0291836 A1 | 11/2009 | Ohno et al. |

FOREIGN PATENT DOCUMENTS

| | | |
|---|---|---|
| JP | 2004-083440 | 3/2004 |
| JP | 2011-005446 | 1/2011 |
| WO | WO 2006/040874 | 4/2006 |
| WO | WO 2006/137149 | 12/2006 |
| WO | WO 2009/141878 | 11/2009 |

HONEYCOMB STRUCTURE

CROSS-REFERENCE TO RELATED APPLICATION

The present application is a continuation application of the U.S. patent application Ser. No. 13/327,756 filed Dec. 16, 2011, which claims priority under 35 U.S.C. §119 to International Application No. PCT/JP2011/057858, filed in Japan on Mar. 29, 2011, the contents of these applications are incorporated herein by reference in their entirety.

BACKGROUND OF THE INVENTION

1. Field of the Invention

The present invention relates to a honeycomb structure.

2. Discussion of the Background

Conventionally, the SCR (Selective Catalytic Reduction) system, which reduces NOx to nitrogen and water using ammonia, is known as one of the systems for converting automobile exhaust gas.

Further, zeolite is known as a material that adsorbs ammonia in the SCR system.

WO 06/137149 A1 discloses a honeycomb structure having a honeycomb unit containing zeolite, inorganic fibers and/or whiskers, and an inorganic binder.

The entire contents of WO 06/137149 A1 are incorporated herein by reference.

SUMMARY OF THE INVENTION

According to one aspect of the present invention, a honeycomb structure includes a honeycomb unit. The honeycomb unit has a plurality of through holes defined by partition walls along a longitudinal direction of the honeycomb unit. The partition walls have a thickness of approximately 0.1 mm to approximately 0.4 mm. The honeycomb unit is manufactured by molding raw material paste by extrusion molding and thereafter by firing the molded raw material paste. The raw material paste contains zeolite and an inorganic binder. A specific surface area of the zeolite is more than or equal to approximately 500 m$^2$/g and less than or equal to approximately 800 m$^2$/g. An external surface area of the zeolite is more than or equal to approximately 40 m$^2$/g and less than or equal to approximately 80 m$^2$/g.

BRIEF DESCRIPTION OF THE DRAWINGS

Other features and advantages of the present invention will become more apparent from the following detailed description when read in conjunction with the accompanying drawings, in which.

DESCRIPTION OF THE EMBODIMENTS

Figure 1:
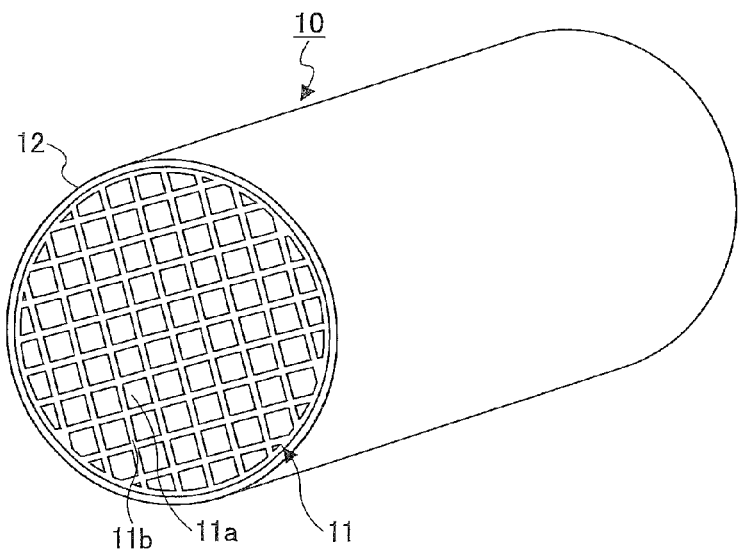
FIG. 1 is a perspective view of a honeycomb structure according to an embodiment of the present invention.

According to an aspect of an embodiment of the presenting invention, a honeycomb structure includes a honeycomb unit having a plurality of through holes defined by partition walls along a longitudinal direction of the honeycomb unit. The honeycomb unit is manufactured by molding raw material paste by extrusion molding and thereafter by firing the molded raw material paste. The raw material paste contains zeolite obtained by ion-exchange with iron ions and an inorganic binder. A specific surface area of the zeolite is more than or equal to approximately 500 m$^2$/g and less than or equal to approximately 800 m$^2$/g. An external surface area of the zeolite is more than or equal to approximately 40 m$^2$/g and less than or equal to approximately 80 m$^2$/g.

According to another aspect of the embodiment of the present invention, a honeycomb structure includes a honeycomb unit having a plurality of through holes defined by partition walls along a longitudinal direction of the honeycomb unit. The honeycomb unit is manufactured by molding raw material paste by extrusion molding and thereafter by firing the molded raw material paste. The raw material paste contains zeolite not subject to ion-exchange with iron ions and an inorganic binder. The zeolite is subjected to ion exchange by immersing the honeycomb unit or the honeycomb structure in an aqueous solution containing iron ions. A specific surface area of the zeolite is more than or equal to approximately 500 m$^2$/g and less than or equal to approximately 800 m$^2$/g. An external surface area of the zeolite is more than or equal to approximately 40 m$^2$/g and less than or equal to approximately 80 m$^2$/g.

According to further aspect of the embodiment of the present invention, a method of manufacturing a honeycomb structure includes molding raw material paste containing zeolite obtained by ion-exchange with iron ions and an inorganic binder by extrusion molding. The molded raw material paste is fired to manufacture a honeycomb unit. The honeycomb unit is included in the honeycomb structure and has a plurality of through holes defined by partition walls along a longitudinal direction of the honeycomb unit. A specific surface area of the zeolite is more than or equal to approximately 500 m$^2$/g and less than or equal to approximately 800 m$^2$/g, and an external surface area of the zeolite is more than or equal to approximately 40 m$^2$/g and less than or equal to approximately 80 m$^2$/g.

According to further aspect of the embodiment of the present invention, a method of manufacturing a honeycomb structure includes molding raw material paste containing zeolite not subject to ion-exchange with iron ions and an inorganic binder by extrusion molding. The molded raw material paste is fired to manufacture a honeycomb unit. The honeycomb unit is included in the honeycomb structure and has a plurality of through holes defined by partition walls along a longitudinal direction of the honeycomb unit. The honeycomb unit or the honeycomb structure is immersed in an aqueous solution containing iron ions to apply ion-exchange with iron ions to the zeolite. A specific surface area of the zeolite is more than or equal to approximately 500 m$^2$/g and less than or equal to approximately 800 m$^2$/g, and an external surface area of the zeolite is more than or equal to approximately 40 m$^2$/g and less than or equal to approximately 80 m$^2$/g.

According to further aspect of the embodiment of the present invention, an exhaust gas converter includes a metal container and the honeycomb structure. The honeycomb structure is canned into the metal container with a holding sealing member provided around the honeycomb structure.

There is a demand for honeycomb structures that are better in NOx conversion performance than the conventional honeycomb structure disclosed in WO 06/137149 A1. Therefore, zeolite such as β-zeolite ion-exchanged with iron ions, which is excellent in NOx conversion performance, may be used as a material of a honeycomb unit of the honeycomb structure.

According to the embodiment of the present invention, it is possible to obtain a honeycomb structure excellent in NOx conversion performance, a method of manufacturing the honeycomb structure, and an exhaust gas converter having the honeycomb structure.

The embodiments will now be described with reference to the accompanying drawings, wherein like reference numerals designate corresponding or identical elements throughout the various drawings.

FIG. 1 illustrates a honeycomb structure according to the embodiment of the present invention. A honeycomb structure 10 includes a single honeycomb unit 11 having multiple through holes 11a defined by partition walls 11b along a longitudinal direction. Further, the honeycomb unit 11 is manufactured by molding raw material paste containing zeolite ion-exchanged with iron ions and an inorganic binder by extrusion molding; and by firing the molded raw material paste. Further, an outer peripheral coat layer 12 is formed on the outer peripheral surface of the honeycomb unit 11, which excludes its end faces.

Hereinafter, the term "zeolite" means the zeolite contained in the raw material paste.

The specific surface area of zeolite is approximately 500 $m^2/g$ to approximately 800 $m^2/g$, preferably approximately 500 $m^2/g$ to approximately 600 $m^2/g$, and more preferably, approximately 535 $m^2/g$ to approximately 538 $m^2/g$. If the specific surface area of zeolite is more than or equal to approximately 500 $m^2/g$, the number of pores in the honeycomb unit 11 is less likely to decrease. Therefore, exhaust gas is likely to penetrate into the partition walls 11b of the honeycomb unit 11, so that zeolite is likely to be used effectively for NOx conversion. On the other hand, it is less likely to be difficult to manufacture zeolite if the specific surface area of zeolite is less than or equal to approximately 800 $m^2/g$.

The specific surface area of zeolite may be measured using the single-point BET method ($N_2$ adsorption method). Further, in measuring the specific surface area of zeolite, for example, TriStar 3000, a micrometrics automatic surface area and porosimetry analyzer (manufactured by Shimadzu Corporation), may be used.

The external surface area of zeolite is approximately 40 $m^2/g$ to approximately 80 $m^2/g$, preferably approximately 40 $m^2/g$ to approximately 60 $m^2/g$, and more preferably, approximately 40 $m^2/g$ to approximately 52 $m^2/g$. If the external surface area of zeolite is more than or equal to approximately 40 $m^2/g$, the ratio of the external surface area to the specific surface area of zeolite is less likely to be reduced. That is, pores at the surface of zeolite are less likely to increase so that zeolite is likely to be used effectively for NOx conversion. On the other hand, it is less likely to be difficult to manufacture zeolite if the external surface area of zeolite is less than or equal to approximately 80 $m^2/g$.

The external surface area of zeolite may be measured using the t-plot method ($N_2$ adsorption method). Further, in measuring the external surface area of zeolite, for example, TriStar 3000, a micrometrics automatic surface area and porosimetry analyzer (manufactured by Shimadzu Corporation), may be used.

The amount of ion exchange with iron ions of zeolite is preferably more than or equal to approximately 1.6 mass %. If the amount of ion exchange with iron ions of zeolite is more than or equal to approximately 1.6 mass %, the NOx conversion performance is likely to improve sufficiently.

It is less likely to be difficult to manufacture zeolite if the amount of ion exchange with iron ions of zeolite is less than or equal to approximately 5.0 mass %. Therefore, the amount of ion exchange with iron ions of zeolite is more preferably approximately 1.6 mass % to approximately 5.0 mass %. Further, the amount of ion exchange with iron ions of zeolite is still more preferably approximately 3.6 mass % to approximately 4.7 mass %.

Zeolite may be further ion-exchanged with transition metal ions or the like capable of improving NOx conversion performance.

Letting the amount of ion exchange with iron ions, the specific surface area, and the external surface area of zeolite be M [mass %], $S_1$ [$m^2/g$], and $S_2$ [$m^2/g$], respectively, it is preferable that the expression of approximately $0.25 \leq M \times (S_2/S_1) \leq$ approximately $0.60$ be satisfied, and it is more preferable that the expression of approximately $0.27 \leq M \times (S_2/S_1) \leq$ approximately $0.45$ be satisfied. If $M \times (S_2/S_1)$ is more than or equal to approximately 0.25 mass %, the NOx conversion performance is likely to improve sufficiently. On the other hand, it is less likely to be difficult to manufacture zeolite if $M \times (S_2/S_1)$ is less than or equal to approximately 0.60 mass %.

The average particle size of the secondary particles of zeolite is preferably approximately 3 μm to approximately 5 μm. If the average particle size of the secondary particles of zeolite is more than or equal to approximately 3 μm, exhaust gas is likely to penetrate into the partition walls 11b of the honeycomb unit 11, so that zeolite is likely to be used effectively for NOx conversion. On the other hand, if the average particle size of the secondary particles of zeolite is less than or equal to approximately 5 μm, the number of pores in the honeycomb unit 11 is less likely to be reduced. Therefore, exhaust gas is likely to penetrate into the partition walls 11b of the honeycomb unit 11, so that zeolite is likely to be used effectively for NOx conversion.

Zeolite is not limited in particular, and may be β-zeolite, zeolite ZSM-5 or the like, where two or more kinds of zeolite may be used together. Of these, β-zeolite is preferable because of its excellent NOx conversion performance.

The zeolite content per apparent volume of the honeycomb unit 11 is preferably approximately 230 g/L to approximately 400 g/L. If the zeolite content per apparent volume of the honeycomb unit 11 is more than or equal to approximately 230 g/L, it is not necessary to increase the apparent volume of the honeycomb unit 11 in order to improve the NOx conversion performance. On the other hand, if the zeolite content per apparent volume of the honeycomb unit 11 is less than or equal to approximately 400 g/L, the strength of the honeycomb unit 11 is less likely to be insufficient and the opening ratio of the honeycomb unit 11 is less likely to be reduced.

The inorganic binder contained in the raw material paste is not limited in particular, and may be alumina sol, silica sol, titania sol, water glass, sepiolite, attapulgite, boehmite or the like, where two or more kinds of inorganic binders may be used together.

The amount of the solids content of the inorganic binder contained in the solids content of the raw material paste is preferably approximately 5 mass % to approximately 30 mass %, and more preferably, approximately 10 mass % to approximately 20 mass %. If the amount of the solids content of the inorganic binder contained in the solids content of the raw material paste is more than or equal to approximately 5 mass %, the strength of the honeycomb unit 11 is less likely to be reduced. On the other hand, if the amount of the solids content of the inorganic binder contained in the solids content of the raw material paste is less than or equal to approximately 30 mass %, it is less likely to be difficult to perform extrusion molding of the honeycomb unit 11.

It is preferable that the raw material paste further include one or more selected from the group consisting of inorganic fibers, a flake substance, a tetrapod-shaped substance, and a three-dimensional needle-shaped substance in order to increase the strength of the honeycomb unit 11.

The material of the inorganic fibers contained in the raw material paste is not limited in particular, and may be alumina, silica, silicon carbide, silica-alumina, glass, potassium titanate, aluminum borate or the like, where two or more kinds of materials may be used together.

The aspect ratio of the inorganic fibers contained in the raw material paste is preferably approximately 2 to approximately 1000, more preferably approximately 5 to approximately 800, and still more preferably, approximately 10 to approximately 500. If the aspect ratio of the inorganic fibers contained in the raw material paste is more than or equal to approximately 2, the strength increasing effect on the honeycomb unit 11 is less likely to be reduced. On the other hand, if the aspect ratio of the inorganic fibers contained in the raw material paste is less than or equal to approximately 1000, clogging is less likely to occur in a die at the time of the extrusion molding of the honeycomb unit 11, and the inorganic fibers are less likely to break so that the strength increasing effect on the honeycomb unit 11 is less likely to be reduced.

The flake substance means a flat substance. Preferably, the flake substance has a thickness of approximately 0.2 μm to approximately 5.0 μm, a maximum length of approximately 10 μm to approximately 160 μm, and a ratio of maximum length to thickness of approximately 3 to approximately 250.

The material of the flake substance contained in the raw material paste is not limited in particular, and may be glass, muscovite, alumina, silica or the like, where two or more kinds of materials may be used together.

The tetrapod-shaped substance means a substance whose needle-shaped portions extend three-dimensionally. Preferably, the needle-shaped portions are approximately 5 μm to approximately 30 μm in average needle length and approximately 0.5 μm to approximately 5.0 μm in average diameter.

The material of the tetrapod-shaped substance contained in the raw material paste is not limited in particular, and may be zinc oxide or the like. Two or more of such materials may be used together.

The three-dimensional needle-shaped substance means a substance whose needle-shaped portions are combined with an inorganic compound such as glass near their respective centers. Preferably, the needle-shaped portions are approximately 5 μm to approximately 30 μm in average needle length and approximately 0.5 μm to approximately 5.0 μm in average diameter.

Further, the three-dimensional needle-shaped substance may have multiple needle-shaped portions in succession three-dimensionally. Preferably, the needle-shaped portions have a diameter of approximately 0.1 μm to approximately 5.0 μm, a length of approximately 0.3 μm to approximately 30.0 μm, and a length-to-diameter ratio of approximately 1.4 to approximately 50.0.

The material of the three-dimensional needle-shaped substance contained in the raw material paste is not limited in particular, and may be alumina, silica, silicon carbide, silica-alumina, glass, potassium titanate, aluminum borate, boehmite or the like, where two or more kinds of materials may be used together.

The amount of the inorganic fibers, the flake substance, the tetrapod-shaped substance, and/or the three-dimensional needle-shaped substance contained in the solids content of the raw material paste is preferably approximately 3 mass % to approximately 50 mass %, more preferably approximately 3 mass % to approximately 30 mass %, and still more preferably, approximately 5 mass % to approximately 20 mass %. If the amount of the inorganic fibers, the flake substance, the tetrapod-shaped substance, and/or the three-dimensional needle-shaped substance contained in the solids content of the raw material paste is more than or equal to approximately 3 mass %, the strength increasing effect on the honeycomb unit 11 is less likely to be reduced. If the amount of the inorganic fibers, the flake substance, the tetrapod-shaped substance, and/or the three-dimensional needle-shaped substance contained in the solids content of the raw material paste is less than or equal to approximately 50 mass %, the zeolite content of the honeycomb unit 11 is less likely to be reduced, so that the NOx conversion performance is less likely to be reduced.

Preferably, the honeycomb unit 11 has a porosity of approximately 20% to approximately 50%. If the porosity of the honeycomb unit 11 is more than or equal to approximately 20%, exhaust gas is likely to penetrate into the partition walls 11b of the honeycomb unit 11, so that zeolite is likely to be used effectively for NOx conversion. On the other hand, if the porosity of the honeycomb unit 11 is less than or equal to approximately 50%, the strength of the honeycomb unit 11 is less likely to be insufficient.

The porosity of the honeycomb unit 11 may be measured using mercury intrusion porosimetry.

The honeycomb unit 11 preferably has an opening ratio of approximately 50% to approximately 75% in a cross section perpendicular to its longitudinal direction. If the opening ratio of the cross section perpendicular to the longitudinal direction of the honeycomb unit 11 is more than or equal to approximately 50%, zeolite is likely to be used effectively for NOx conversion. On the other hand, if the opening ratio of the cross section perpendicular to the longitudinal direction of the honeycomb unit 11 is less than or equal to approximately 75%, the strength of the honeycomb unit 11 is less likely to be insufficient.

The density of the through holes 11a of the honeycomb unit 11 in a cross section perpendicular to its longitudinal direction is preferably approximately 31 cells/cm$^2$ to approximately 155 cells/cm$^2$. If the density of the through holes 11a of the cross section perpendicular to the longitudinal direction of the honeycomb unit 11 is more than or equal to approximately 31 cells/cm$^2$, exhaust gas and zeolite are likely to make contact, so that the NOx conversion performance is less likely to be reduced. On the other hand, if the density of the through holes 11a of the cross section perpendicular to the longitudinal direction of the honeycomb unit 11 is less than or equal to approximately 155 cells/cm$^2$, the pressure loss of the honeycomb structure 10 is less likely to increase.

The partition walls 11b of the honeycomb unit 11 are preferably approximately 0.1 mm to approximately 0.4 mm, and more preferably, approximately 0.1 mm to approximately 0.3 mm in thickness. If the partition walls 11b are more than or equal to approximately 0.1 mm in thickness, the strength of the honeycomb unit 11 is less likely to be reduced. On the other hand, if the partition walls 11b are less than or equal to approximately 0.4 mm in thickness, exhaust gas is likely to penetrate into the partition walls 11b, so that zeolite is likely to be used effectively for NOx conversion.

The outer peripheral coat layer 12 is preferably approximately 0.1 mm to approximately 2.0 mm in thickness. If the outer peripheral coat layer 12 is more than or equal to approximately 0.1 mm in thickness, the strength increasing effect on the honeycomb structure 10 is less likely to be insufficient. On the other hand, if the outer peripheral coat layer 12 is less than or equal to approximately 2.0 mm in thickness, the zeolite content per unit volume of the honeycomb structure 10 is less likely to be reduced, so that the NOx conversion performance is less likely to be reduced.

The honeycomb structure 10 is not limited to a substantially cylindrical shape, and may have a substantially polygonal pillar shape, a substantially cylindroid shape, a substantially elliptic cylindrical shape, a substantially roundly chamfered polygonal pillar shape (such as a substantially roundly chamfered triangular pillar shape) or the like.

The through holes 11a are not limited to a substantially quadrangular pillar shape, and may have a substantially triangular pillar shape, a substantially hexagonal pillar shape or the like.

Next, a description is given of a method of manufacturing the honeycomb structure 10 according to the embodiment of the present invention. First, a substantially cylindrical honeycomb molded body having multiple through holes defined by partition walls along a longitudinal direction is manufactured by extrusion molding using raw material paste containing zeolite ion-exchanged with iron ions and an inorganic binder and further containing one or more selected from the group consisting of inorganic fibers, a flake substance, a tetrapod-shaped substance, and a three-dimensional needle-shaped substance as required.

An organic binder, a dispersion medium, a molding aid, etc., may be suitably added to the raw material paste as required.

The organic binder is not limited in particular, and may be methylcellulose, carboxymethylcellulose, hydroxyethylcellulose, polyethylene glycol, phenolic resin, epoxy resin or the like, where two or more kinds of organic binders may be used together. The amount of addition of the organic binder is preferably approximately 1% to approximately 10% of the total mass of zeolite and an inorganic binder, and if contained, one or more of inorganic fibers, a flake substance, a tetrapod-shaped substance, and a three-dimensional needle-shaped substance.

The dispersion medium is not limited in particular, and may be water, an organic solvent such as benzene, alcohol such as methanol, or the like, where two or more kinds of dispersion media may be used together.

The molding aid is not limited in particular, and may be ethylene glycol, dextrin, a fatty acid, fatty acid soap, polyalcohol or the like, where two or more kinds of molding aids may be used in particular.

It is preferable to mix and knead the raw material paste in its preparation. The raw material paste may be mixed using a mixer, an attritor or the like, and may be kneaded using a kneader or the like.

Next, a honeycomb dried body is manufactured by drying the obtained honeycomb molded body using a drying apparatus such as a microwave drying apparatus, a hot air drying apparatus, a dielectric drying apparatus, a reduced-pressure drying apparatus, a vacuum drying apparatus, and a freeze drying apparatus.

Further, a honeycomb degreased body is manufactured by degreasing the honeycomb dried body. The conditions for degreasing, which may be suitably selected in accordance with the kind and the amount of organic matter included in the honeycomb dried body, are preferably approximately 400° C. and approximately 2 hours.

Next, the substantially cylindrical honeycomb unit 11 is manufactured by firing the honeycomb degreased body. The firing temperature is preferably approximately 600° C. to approximately 1200° C., and more preferably, approximately 600° C. to approximately 1000° C. If the firing temperature is more than or equal to approximately 600° C., sintering is likely to progress, so that the strength of the honeycomb unit 11 is less likely to be reduced. On the other hand, if the firing temperature is less than or equal to approximately 1200° C., sintering is less likely to progress excessively, so that the reaction sites of zeolite is less likely to be reduced.

Next, outer peripheral coat layer paste is applied on the outer peripheral surface, which excludes both end faces, of the substantially cylindrical honeycomb unit 11.

The peripheral coat layer paste is not limited in particular, and may be a mixture of an inorganic binder and inorganic particles; a mixture of an inorganic binder and inorganic fibers; a mixture of an inorganic binder, inorganic particles, and inorganic fibers; or the like.

The inorganic binder contained in the outer peripheral coat layer is not limited in particular, and may be silica sol, alumina sol, or the like, where two or more kinds of inorganic binders may be used together. Of these, silica sol is a preferable form of addition of the inorganic binder.

The material of the inorganic particles contained in the outer peripheral coat layer paste is not limited in particular, and may be a carbide such as silicon carbide, a nitride such as silicon nitride or boron nitride, or the like, where two or more of materials may be used together. Of these, silicon carbide is preferable because of its excellent thermal conductivity.

The material of the inorganic fibers contained in the outer peripheral coat layer paste is not limited in particular, and may be silica-alumina, mullite, alumina, silica or the like, where two or more kinds of materials may be used together. Of these, alumina is preferable.

The outer peripheral coat layer paste may further contain an organic binder.

The organic binder contained in the outer peripheral coat layer paste is not limited in particular, and may be polyvinyl alcohol, methylcellulose, ethylcellulose, carboxymethylcellulose or the like, where two or more kinds of materials may be used together.

The outer peripheral coat layer paste may further contain balloons, which are minute hollow balls of oxide-based ceramic, a pore-forming agent, or the like.

The balloons contained in the outer peripheral coat layer paste are not limited in particular, and may be alumina balloons, glass microballoons, shirasu balloons, fly ash balloons, mullite balloons or the like, where two or more kinds of balloons may be used together. Of these, alumina balloons are preferable.

The pore-forming agent contained in the outer peripheral coat layer paste is not limited in particular, and may be spherical acryl particles, graphite or the like, where two or more kinds of pore-forming agents may be used together.

Next, the honeycomb unit 11 with the outer peripheral coat layer paste applied is dried and solidified, so that the substantially cylindrical honeycomb structure 10 is manufactured. At this point, it is preferable to perform degreasing if the outer peripheral coat layer paste includes an organic binder. The conditions for degreasing, which may be suitably selected in accordance with the kind and the amount of the organic binder, are preferably approximately 700° C. and approximately 20 minutes.

Zeolite not ion-exchanged with iron ions may be used in place of zeolite ion-exchanged with iron ions and be subjected to ion exchange by immersing the honeycomb unit 11 or the honeycomb structure 10 in an aqueous solution containing iron ions (for example, an aqueous ferric nitrate solution).

Figure 2:
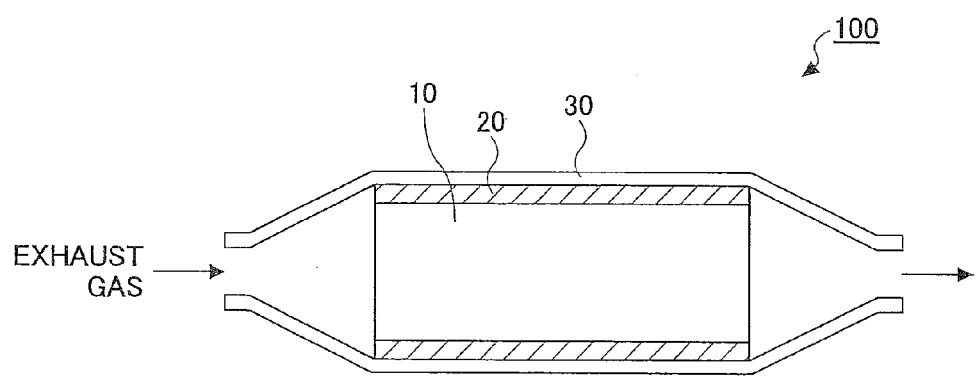
FIG. 2 is a cross-sectional view of an exhaust gas converter according to the embodiment of the present invention.

FIG. 2 illustrates an exhaust gas converter according to the embodiment of the present invention. An exhaust gas converter 100 may be manufactured by canning the honeycomb structure 10 into a metal container (shell) 30 with a holding sealing member 20 provided around the honeycomb structure 10. Further, an ejecting part (not graphically illustrated) such as an eject nozzle for ejecting ammonia or a compound to generate ammonia when decomposed is provided inside a pipe (not graphically illustrated) on the upstream side of the honeycomb structure 10 in the exhaust gas flowing direction in the exhaust gas converter 100. As a result, ammonia is added to the exhaust gas, so that NOx contained in the exhaust gas is reduced by the zeolite contained in the honeycomb unit 11.

The compound to generate ammonia when decomposed is not limited in particular as long as the compound is capable of generating ammonia by being heated by exhaust gas in the pipe. Urea water is preferable because of its excellent storage stability.

Urea water is hydrolyzed by being heated by exhaust gas in the pipe to generate ammonia.

Figure 3:
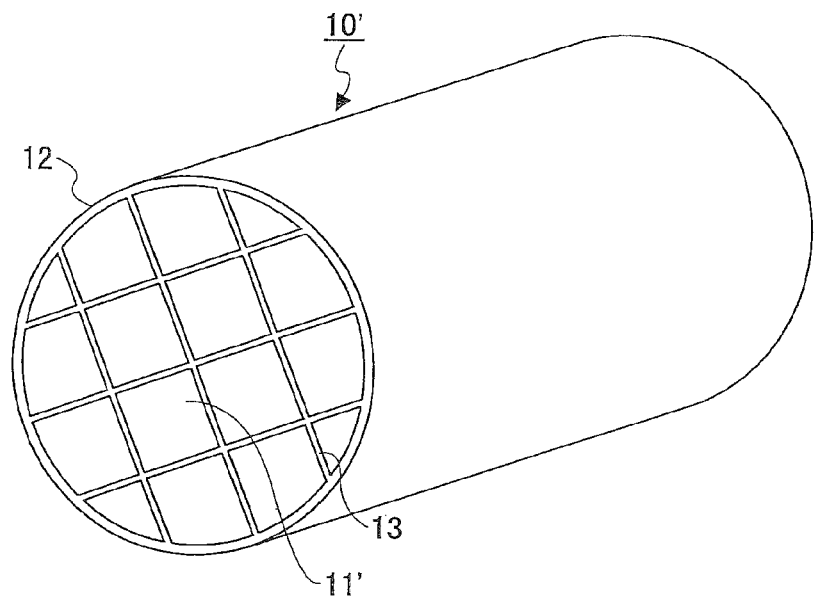
FIG. 3 is a perspective view of another honeycomb structure according to the embodiment of the present invention.
Figure 4:
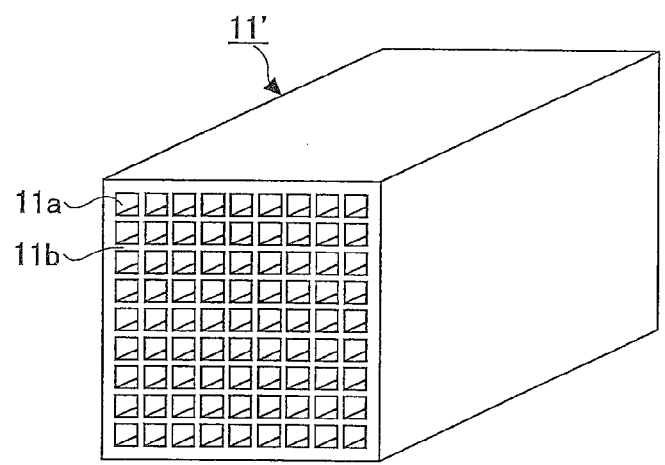
FIG. 4 is a perspective view of a honeycomb unit of the honeycomb structure of FIG. 3 according to the embodiment of the present invention.

FIG. 3 illustrates another honeycomb structure according to the embodiment of the present invention. A honeycomb structure 10' is substantially the same as the honeycomb structure 10 except that multiple honeycomb units 11' (FIG. 4) having the multiple through holes 11a defined by partition walls 11b along a longitudinal direction are bonded with an adhesive layer 13 interposed between the honeycomb units 11'.

The honeycomb unit 11' preferably has a cross-sectional area of approximately 10 cm$^2$ to approximately 200 cm$^2$ in a cross section perpendicular to its longitudinal direction. If the cross-sectional area of the cross section perpendicular to the longitudinal direction of the honeycomb unit 11' is more than or equal to approximately 10 cm$^2$, the pressure loss of the honeycomb structure 10' is less likely to increase. On the other hand, if the cross-sectional area of the cross section perpendicular to the longitudinal direction of the honeycomb unit 11' is less than or equal to approximately 200 cm$^2$, the strength of the honeycomb unit 11' against a thermal stress generated in the honeycomb unit 11' is less likely to be insufficient.

The honeycomb unit 11' has substantially the same configuration as the honeycomb unit 11 except for the cross-sectional area of the cross section perpendicular to the longitudinal direction.

The adhesive layer 13 is preferably approximately 0.5 mm to approximately 2.0 mm in thickness. If the adhesive layer 13 is more than or equal to approximately 0.5 mm in thickness, the strength of the adhesion of the honeycomb units 11' is less likely to be insufficient. On the other hand, if the adhesive layer 13 is less than or equal to approximately 2.0 mm in thickness, the pressure loss of the honeycomb structure 10' is less likely to increase.

Next, a description is given of a method of manufacturing the honeycomb structure 10'. First, the substantially quadrangular-pillar-shaped honeycomb units 11' are manufactured in substantially the same manner as the honeycomb unit 11 of the honeycomb structure 10. Next, adhesive layer paste is applied on the outer peripheral surfaces of the honeycomb units 11', which exclude their end faces, and the honeycomb units 11' are successively bonded to be dried and solidified, so that an aggregate of the honeycomb units 11' is manufactured.

The adhesive layer paste is not limited in particular, and may be a mixture of an inorganic binder and inorganic particles; a mixture of an inorganic binder and inorganic fibers; a mixture of an inorganic binder, inorganic particles, and inorganic fibers; or the like.

The inorganic binder contained in the adhesive layer paste is not limited in particular, and may be silica sol, alumina sol, or the like, where two or more kinds of inorganic binders may be used together. Of these, silica sol is a preferable form of addition of the inorganic binder.

The material of the inorganic particles contained in the adhesive layer paste is not limited in particular, and may be a carbide such as silicon carbide, a nitride such as silicon nitride or boron nitride, or the like, where two or more of materials may be used together. Of these, silicon carbide is preferable because of its excellent thermal conductivity.

The material of the inorganic fibers contained in the adhesive layer paste is not limited in particular, and may be silica-alumina, mullite, alumina, silica or the like, where two or more kinds of materials may be used together. Of these, alumina is preferable.

The adhesive layer paste may contain an organic binder.

The organic binder contained in the adhesive layer paste is not limited in particular, and may be polyvinyl alcohol, methylcellulose, ethylcellulose, carboxymethylcellulose or the like, where two or more kinds of organic binders may be used together.

The adhesive layer paste may further contain balloons, which are minute hollow balls of oxide-based ceramic, a pore-forming agent, or the like.

The balloons contained in the adhesive layer paste are not limited in particular, and may be alumina balloons, glass microballoons, shirasu balloons, fly ash balloons, mullite balloons or the like, where two or more kinds of balloons may be used together. Of these, alumina balloons are preferable.

The pore-forming agent contained in the adhesive layer paste is not limited in particular, and may be spherical acryl particles, graphite or the like, where two or more kinds of pore-forming agents may be used together.

Next, the aggregate of the honeycomb units 11' is cut into a substantially cylindrical shape and is thereafter ground as required, so that a substantially cylindrical aggregate of the honeycomb units 11' is manufactured.

The substantially cylindrical aggregate of the honeycomb units 11' may also be manufactured by bonding honeycomb units 11' whose cross sections perpendicular to their longitudinal directions have a predetermined shape instead of cutting the aggregate of the honeycomb units 11' into a substantially cylindrical shape. In this case, the cross sections of the honeycomb units 11' perpendicular to their longitudinal directions preferably have a substantially sectorial shape having a central angle of approximately 90°.

Next, outer peripheral coat layer paste is applied on the outer peripheral surface of the substantially cylindrical aggregate of the honeycomb units 11', which surface excludes its end faces.

The outer peripheral coat layer paste may be substantially the same as or different from the adhesive layer paste.

Next, the substantially cylindrical aggregate of the honeycomb units 11' having the outer peripheral coat layer paste applied is dried and solidified, so that the substantially cylindrical honeycomb structure 10' is manufactured. At this point, it is preferable to perform degreasing if the adhesive layer paste and/or the outer peripheral coat layer paste includes an organic binder. The conditions for degreasing, which may be suitably selected in accordance with the kind and the amount of the organic binder, are preferably approximately 700° C. and approximately 20 minutes.

The honeycomb structures 10 and 10' may be without the outer peripheral coat layer 12.

EXAMPLES

In the following examples, the term "part" means "part by mass."

Example 1

β-zeolite having a specific surface area of 535 m²/g, an external surface area of 40 m²/g, and a secondary-particle average particle size of 3 μm was immersed in an aqueous ferric nitrate solution to be subjected to ion exchange. The amount of ion exchange with iron ions of the β-zeolite was measured to be 3.6 mass % by performing an ICP emission spectrometry using an ICPS-8100 (manufactured by Shimadzu Corporation).

Raw material paste 1 was prepared by mixing and kneading 2800 parts of the obtained β-zeolite, 1120 parts of a mixture of 72 mass % of boehmite and 28 mass % of an acetic acid and water, 270 parts of alumina fibers of 6 μm in average fiber diameter and 100 μm in average fiber length, 380 parts of methylcellulose, 310 parts of an oleic acid, and 2400 parts of ion-exchanged water.

Next, the raw material paste 1 was subjected to extrusion molding using an extruder, so that honeycomb molded bodies of a square pillar shape were manufactured. Then, the honeycomb molded bodies were dried at 110° C. for 10 minutes using a microwave drying apparatus and a hot air drying apparatus, and were thereafter degreased at 400° C. for 5 hours. Next, the degreased honeycomb molded bodies were fired at 700° C. for 2 hours, so that honeycomb units 11' were manufactured. The honeycomb units 11' had a square pillar shape of 38 mm square and 150 mm in length, and had a through hole 11a density of 65 cells/cm² and a partition wall 11b thickness of 0.28 mm.

Next, adhesive layer paste was prepared by mixing and kneading 767 parts of alumina fibers of 0.5 μm in average fiber diameter and 15 μm in average fiber length, 2500 parts of silica glass, 17 parts of carboxymethylcellulose, 600 parts of silica sol of a solids content of 30 mass %, 167 parts of polyvinyl alcohol, 167 parts of a surfactant, and 17 parts of alumina balloons.

The adhesive layer paste was applied on the outer peripheral surfaces of the honeycomb units 11', which surfaces exclude their respective end faces, so that the adhesive layer 13 is to be 2.0 mm in thickness. Sixteen of the honeycomb units 11' were bonded to be subjected to drying and solidifying at 150° C. for 10 minutes, and were cut into a cylindrical shape using a diamond cutter so that its cross section perpendicular to a longitudinal direction was substantially symmetrical with respect to a point, thereby manufacturing an aggregate of the honeycomb units 11'.

Further, the adhesive layer paste was applied on the outer peripheral surface of the aggregate of the honeycomb units 11' so that the outer peripheral coat layer is to be 1.0 mm in thickness. Thereafter, the adhesive layer paste was dried and solidified at 150° C. for 10 minutes using a microwave drying apparatus and a hot air drying apparatus, and degreasing was performed at 400° C. for 2 hours, so that a cylindrical honeycomb structure 10' of 160 mm in diameter and 150 mm in length was manufactured.

Example 2

A honeycomb structure 10' was manufactured in the same manner as in Example 1 except that the amount of ion exchange of zeolite was changed to 4.7 mass % using β-zeolite having a specific surface area of 538 m²/g, an external surface area of 52 m²/g, and a secondary-particle average particle size of 3 μm.

Example 3

A honeycomb structure 10' was manufactured in the same manner as in Example 1 except that the amount of ion exchange of zeolite was changed to 4.7 mass %.

Comparative Example 1

A honeycomb structure was manufactured in the same manner as in Example 1 except that the amount of ion exchange of zeolite was changed to 3.3 mass % using β-zeolite having a specific surface area of 521 m²/g, an external surface area of 35 m²/g, and a secondary-particle average particle size of 3 μm.

Comparative Example 2

A honeycomb structure was manufactured in the same manner as in Example 1 except that the amount of ion exchange of zeolite was changed to 4.6 mass % using β-zeolite having a specific surface area of 507 m²/g, an external surface area of 20 m²/g, and a secondary-particle average particle size of 3 μm.

[Measurement of Specific Surface Area and External Surface Area of Zeolite]

The amount adsorbed V $[cm^3(STP) \cdot g^{-1}]$ was plotted against the relative pressure $P/P_0$, that is, a nitrogen adsorption/desorption isotherm was created, using TriStar 3000, a micrometrics automatic surface area and porosimetry analyzer (manufactured by Shimadzu Corporation), and the specific surface area and the external surface area were determined using the single point BET method and the t-plot method. Specifically, the specific surface area is determined from the plot of $P/V(P_0-P)$ $[g \cdot cm^3(STP)^{-1}]$ against the relative pressure $P/P_0$, that is, the BET plot, and the external surface area was determined from the plot of $P/V(P_0-P)$ $[g \cdot cm^3(STP)^{-1}]$ against the adsorbed layer thickness t [nm], that is, the t-plot.

[Evaluation of NOx Conversion Rate]

Samples having a square pillar shape of 30 mm square and 30 mm in length were cut out using a diamond cutter from the honeycomb units manufactured in Examples 1 through 3 and Comparative Examples 1 and 2.

The outflow of NOx flowing out of each sample was measured using a catalyst evaluator SIGU-2000 (manufactured by HORIBA, Ltd.) while causing a simulated gas of 200° C. to flow through the sample at a space velocity (SV) of 35,000/hr, and the NOx conversion rate [%] expressed by (NOx inflow−NOx outflow)/(NOx inflow)×100 was measured. The constituents of the simulated gas are 210 ppm of nitrogen monoxide, 70 ppm of nitrogen dioxide, 420 ppm of ammonia, 14% of oxygen, 10% of water, and nitrogen (balance).

Table 1 shows the results of the evaluation of the NOx conversion rates of the samples and the characteristics, that is, the specific surface area $S_1$, the external surface area $S_2$, the amount of ion exchange M, and $M \times (S_2/S_1)$, of β-zeolite.

TABLE 1

|  | β-ZEOLITE | | | | |
| --- | --- | --- | --- | --- | --- |
|  | SPECIFIC SURFACE AREA $S_1$ [m²/g] | EXTERNAL SURFACE AREA $S_2$ [m²/g] | INO EXCHANGE AMOUNT M [mass %] | M × ($S_2/S_1$) [mass %] | NOx CONVERSION RATE [%] |
| EXAMPLE 1 | 535 | 40 | 3.6 | 0.27 | 50 |
| EXAMPLE 2 | 538 | 52 | 4.7 | 0.45 | 50 |
| EXAMPLE 3 | 535 | 40 | 4.7 | 0.35 | 49 |
| COMPARATIVE EXAMPLE 1 | 521 | 35 | 3.3 | 0.22 | 35 |
| COMPARATIVE EXAMPLE 2 | 507 | 20 | 4.6 | 0.18 | 27 |

Table 1 shows that the samples cut out from the honeycomb units 11' of Examples 1 through 3 have NOx conversion rates of 49% to 50% and are excellent in NOx conversion performance at 200° C.

On the other hand, the samples cut out from the honeycomb units of Comparative Examples 1 and 2 have a NOx conversion rate of 35% and a NOx conversion rate of 27%, respectively, thus being poor in NOx conversion performance at 200° C. This is believed to be because the ratio of the external surface area $S_2$ to the specific surface area $S_1$, $S_2/S_1$, is likely to be reduced, that is, the number of pores at the surface of zeolite is likely to increase, so that zeolite is less likely to be effectively used for NOx conversion.

From the results of the evaluation of the NOx conversion rates of the samples in Table 1, it is believed that the honeycomb units 11' before cutting out the samples and the honeycomb structures 10' in Examples 1 through 3 also are excellent in NOx conversion performance at 200° C.

Obviously, numerous modifications and variations of the present invention are possible in light of the above teachings. It is therefore to be understood that within the scope of the appended claims, the invention may be practiced otherwise than as specifically described herein.

What is claimed is:

1. A honeycomb structure comprising:
a honeycomb unit having a plurality of through holes defined by partition walls along a longitudinal direction of the honeycomb unit, the partition walls having a thickness of approximately 0.1 mm to approximately 0.4 mm, the honeycomb unit being manufactured by molding raw material paste by extrusion molding and thereafter by firing the molded raw material paste, the raw material paste containing zeolite and an inorganic binder, a specific surface area of the zeolite being more than or equal to approximately 500 m²/g and less than or equal to approximately 800 m²/g, an external surface area of the zeolite being more than or equal to approximately 40 m²/g and less than or equal to approximately 80 m²/g.

2. The honeycomb structure as claimed in claim 1, wherein the zeolite is obtained by ion exchange.

3. The honeycomb structure as claimed in claim 2, wherein an amount of ion exchange of the zeolite is more than or equal to approximately 1.6 mass % to a mass of the zeolite.

4. The honeycomb structure as claimed in claim 2, wherein letting an amount of ion exchange to a mass of the zeolite, the specific surface area of the zeolite, and the external surface area of the zeolite be M [mass %], $S_1$ [m²/g], and $S_2$ [m²/g], respectively, an expression of approximately $0.25 \leq M \times (S_2/S_1) \leq$ approximately 0.60 is satisfied.

5. The honeycomb structure as claimed in claim 1, wherein an average particle size of secondary particles of the zeolite is more than or equal to approximately 3 μm and less than or equal to approximately 5 μm.

6. The honeycomb structure as claimed in claim 1, wherein the zeolite is one of β-zeolite and zeolite ZSM-5.

7. The honeycomb structure as claimed in claim 1, wherein the raw material paste further contains inorganic fibers, a flake substance, a tetrapod-shaped substance, a three-dimensional needle-shaped substance or a combination thereof.

8. The honeycomb structure as claimed in claim 1, wherein the honeycomb structure has a plurality of honeycomb units comprising the honeycomb unit.

9. The honeycomb structure as claimed in claim 1, wherein the honeycomb unit has a porosity of approximately 20% to approximately 50%.

10. The honeycomb structure as claimed in claim 1, wherein the honeycomb unit has an opening ratio of approximately 50% to approximately 75% in a cross section perpendicular to the longitudinal direction.

11. The honeycomb structure as claimed in claim 1, wherein the honeycomb unit has a density of approximately 31 cells/cm² to approximately 155 cells/cm² in a cross section perpendicular to the longitudinal direction.

* * * * *